Nov. 28, 1961  J. C. TERRY  3,010,241
LURE RETRIEVER
Filed April 7, 1959
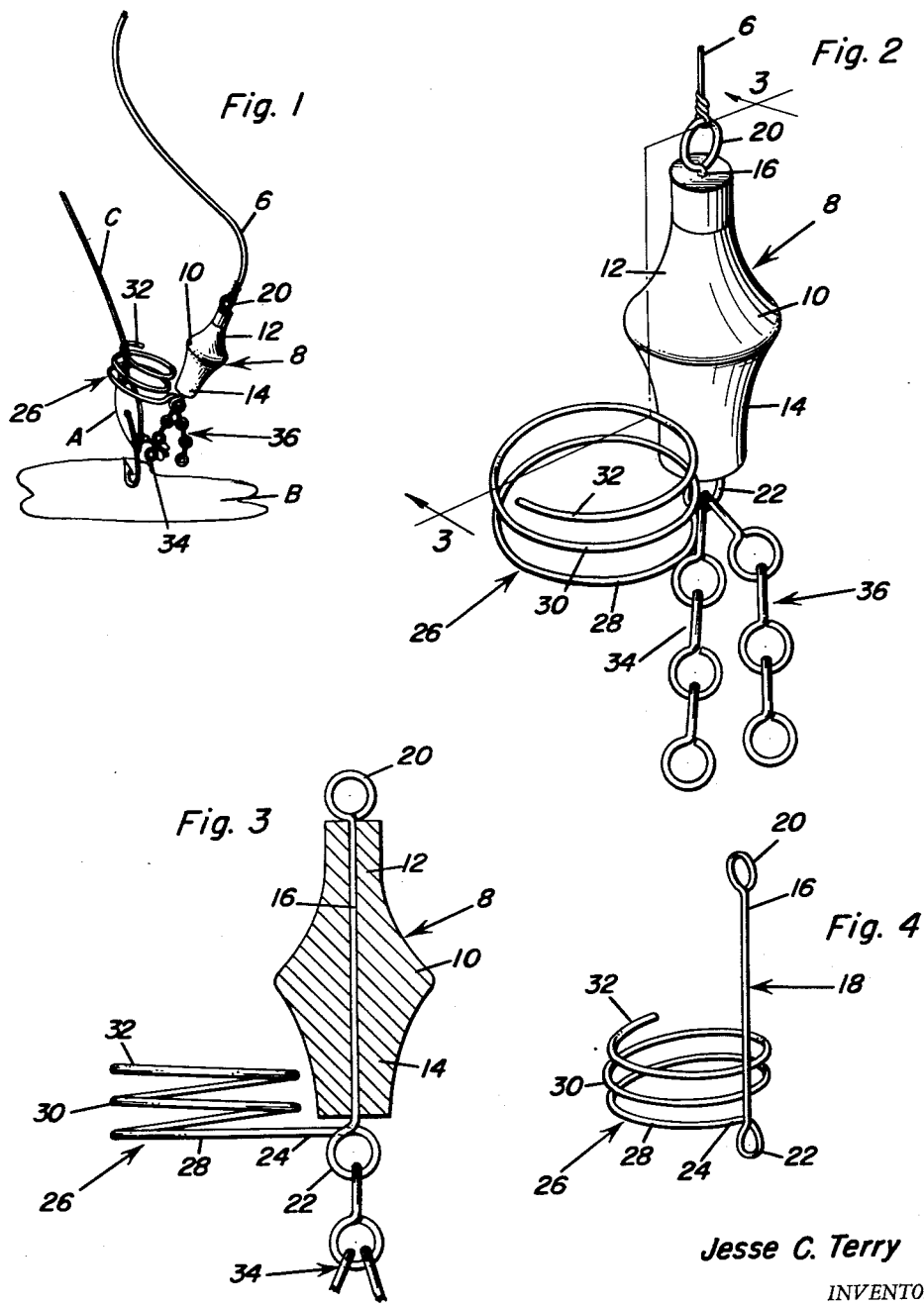
Jesse C. Terry
INVENTOR.

3,010,241
LURE RETRIEVER
Jesse C. Terry, 2604 Sun Valley Road, Knoxville, Tenn.
Filed Apr. 7, 1959, Ser. No. 804,729
2 Claims. (Cl. 43—17.2)

The present invention relates to an improved remote controlled retriever for fishing plugs and lures and has to do with a construction which is characterized by a weight, means for slidingly connecting the weight to a fishing line, and chains on the weight which are allowed to dangle freely to assist in freeing a snagged lure carried by the line.

Lure retrievers having the general characteristics recited are old and well-known. For example, reference to the Stricker Patent 2,494,012 of January 10, 1950, will confirm the observation made. Other patents showing chains could be mentioned but it is not the purpose here to dwell on prior art other than to give general information and leads to the reader. To this end the reader will also find of interest the Russell Patent 2,770,062 of November 13, 1956, which shows a relatively large plug embracing coil which also has the additional function of means for slidably attaching the pear-shaped weight to the captive lifting and lowering line.

An obvious object of the present invention is to structurally, functionally and otherwise improve upon the above-mentioned patents and any analogous prior art retrievers. More particularly and by way of comparison with the Russell patent it is to be pointed out that the principal improvement has to do with a length of wire or suitable rod stock which is bendable upon itself and which has a straight portion providing a shank, eyes at the opposite end of the shank and a lateral relatively large coil spring which constitutes an integral extension of the portion of the rod forming the eye at the lower end thereof. With this arrangement a suitably contoured weight is mounted on the shank to expose the upper and lower eyes enabling the upper eye to accommodate the captive line and the lower eye means for attachment of dangling chains.

Other objects, features and advantages will become more readily apparent from the following description and the accompanying illustrative drawing.

In the drawing:

FIG. 1 is a perspective view showing the improved retriever, how it is constructed and also how it is used in a manner to release a snagged lure so that it may thereafter be retrieved as intact as possible.

FIG. 2 is an enlarged view in perspective of the retriever.

FIG. 3 is a section on the line 3—3 of FIG. 2.

FIG. 4 is a perspective view of the specially bent wire or rod component, a significant aspect of the inventive concept.

In FIG. 1 the lure which is to be retrieved is denoted at A, the log or other part in which the hook has become anchored and snagged is denoted at B. The fishing line is designated by the character C. The aforementioned captive line of the improved retriever is denoted by the numeral 6. The sinker-like weight is denoted at 8. This weight is vertically elongated and has a stout central outstanding endless rib portion 10 and reduced upper and lower truncated conical neck portions 12 and 14 respectively. This weight is of a size and shape that it may be satisfactorily and effectually mounted for use on the shank or straight rod portion 16 of the novel bent rod or wire unit 18 depicted in FIG. 4. The upper end of the wire is bent to form an eye 20 to which the line 6 is connected. The median portion of the wire is bent upon itself to define a second eye 22 and is then bent laterally as at 24 with the portion beyond the point 24 formed into a relatively large springy lure embracing and loosening and retrieving coil 26. Actually the part 26 is similar to a coil spring which is at right angles to the shank 16 and which has a lower coil 28, a second intermediate coil 30 and upper free-ended coil, the free or terminal end of which is denoted at 32. This construction permits the coil spring to be "screwed" removably on the fishing line C. With the weight in place the retriever or coil is suitably offset and occupies a position which is at approximate right angles to the longitudinal axis of the weight. Both eyes 20 and 22 are exposed above and below the upper and lower ends of the weight. The lower eye serves to permit the upper ends of suitably constructed free dangling lure pounding and loosening chains denoted 34 and 36 thereto.

A careful scrutinization of the construction disclosed will reveal that the specially bent one-piece wire or rod unit of FIG. 4 is of critical significance. The bending of this unit in the form illustrated paves the way for expeditious production on a mass production basis. With the construction disclosed it is evident that the lateral or right angular position of the large coil relative to the offset weight and with the coil at the bottom of the weight one can readily connect the device to or disconnect it from the fishing line. Then, too, it is believed that the control line 6 can be utilized to better advantage in aiming the coil and getting it into position for more effective and better releasing and retrieving results. Not only this, the positioning of the chains in accordance with the construction revealed offers a definitely advantageous construction. Experimental use has shown that the invention satisfactorily serves the purpose for which it is intended for use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing lure retriever comprising a single length of substantially rigid but bendable wire having a straight shank portion, the upper end of said shank portion having a line attaching eye, the lower end of the shank portion being bent upon itself and defining a second eye, and an end portion of the wire then extended laterally beyond the locale of the second eye and being bent upon itself and providing a plurality of axially aligned relatively large convolutions offset to one side of the shank portion and defining a coiled lure embracing and retrieving member, said convolutions being disposed in a plane at right angles to the lengthwise axis of said shank portion and being located in a plane just above the plane of said second eye, and an elongated weight having reduced upper and lower truncated conical neck portions and an outstanding median portion, said weight being mounted axially on the shank portion between said eyes and the lower end portion of said weight terminating in a plane above the lowermost convolution of said coiled lure embracing member, and the uppermost convolution being disposed in a plane below the plane of said outstanding median portion.

2. The structure according to claim 1 and in combination, a plurality of chains hung from and suspended by said second eye, said second eye constituting a common support for said coiled lure embracing and retrieving member and also said chains.

References Cited in the file of this patent

UNITED STATES PATENTS

| | | |
|---|---|---|
| 2,397,916 | Bray | Apr. 9, 1946 |
| 2,553,173 | Consolo | May 15, 1951 |
| 2,770,062 | Russell | Nov. 13, 1956 |
| 2,801,489 | Gehring | Aug. 6, 1957 |
| 2,807,905 | Ford | Oct. 1, 1957 |